(12) United States Patent
Patte

(10) Patent No.: US 12,552,211 B2
(45) Date of Patent: Feb. 17, 2026

(54) WORK VEHICLE COMPRISING A SENSOR FOR DETECTING MOVEMENT OF A HEIGHT-SETTABLE AXLE

(71) Applicant: KUBOTA CORPORATION, Osaka (JP)

(72) Inventor: Christophe Patte, Crepy-en-Valois (FR)

( * ) Notice: Subject to any disclaimer, the term of this patent is extended or adjusted under 35 U.S.C. 154(b) by 0 days.

(21) Appl. No.: 19/051,208

(22) Filed: Feb. 12, 2025

(65) Prior Publication Data

US 2025/0256542 A1 Aug. 14, 2025

(30) Foreign Application Priority Data

Feb. 13, 2024 (EP) .................................... 24305242

(51) Int. Cl.
*B60G 9/00* (2006.01)
*B60G 7/00* (2006.01)
*B60G 17/00* (2006.01)

(52) U.S. Cl.
CPC ............. *B60G 9/003* (2013.01); *B60G 7/001* (2013.01); *B60G 7/005* (2013.01); *B60G 17/00* (2013.01); *B60G 2200/30* (2013.01); *B60G 2204/116* (2013.01); *B60G 2204/416* (2013.01); *B60G 2300/082* (2013.01); *B60G 2400/252* (2013.01);
(Continued)

(58) Field of Classification Search
CPC .... B60G 17/0157; B60G 7/001; B60G 13/06; B60G 2200/144; B60G 2200/156; B60G 2300/28; B60G 2500/324; B60F 3/003; B60T 1/065
See application file for complete search history.

(56) References Cited

U.S. PATENT DOCUMENTS 4,390,187 A * 6/1983 Maeda ............... B60G 17/0155
280/124.16
4,546,997 A * 10/1985 Smyers .................... B62D 9/02
280/5.521
(Continued)

FOREIGN PATENT DOCUMENTS

EP 0136669 A2 4/1985
EP 4140786 B1 11/2023
FR 2789946 A1 8/2000

OTHER PUBLICATIONS

English translation of EP0136669.
English translation of FR2789946.

*Primary Examiner* — Paul N Dickson
*Assistant Examiner* — Shams Dhanani

(57) ABSTRACT

A work vehicle comprising a vehicle support structure, a vehicle axle, a longitudinal rocking arm attached to the vehicle axle and comprising a first connection locus connected to the vehicle support structure, a sensor configured for detecting movement of the vehicle axle and a vehicle suspension system comprising a vehicle suspension link device comprising a link element comprising a second connection locus connected to the vehicle axle and a third connection locus connected to the vehicle support structure. The work vehicle comprises a sensor link comprising a first attachment point connected to the vehicle axle and a second attachment point connected to the sensor, the first attachment point being located on a virtual straight axis connecting the first connection locus of the longitudinal rocking arm and the second connection locus of the link element.

19 Claims, 3 Drawing Sheets

(52) U.S. Cl.
CPC .... *B60G 2500/30* (2013.01); *B60G 2800/914* (2013.01)

(56) References Cited

U.S. PATENT DOCUMENTS

| | | | | |
|---|---|---|---|---|
| 5,123,672 A | * | 6/1992 | Walton | B60G 11/04 |
| | | | | 280/5.513 |
| 2001/0028154 A1 | * | 10/2001 | Sebe | B62D 9/02 |
| | | | | 280/86.757 |
| 2006/0180384 A1 | * | 8/2006 | Malvestio | B60G 9/02 |
| | | | | 180/417 |
| 2007/0262656 A1 | * | 11/2007 | Fulks | B62K 5/10 |
| | | | | 307/143 |

\* cited by examiner

[Fig. 1]
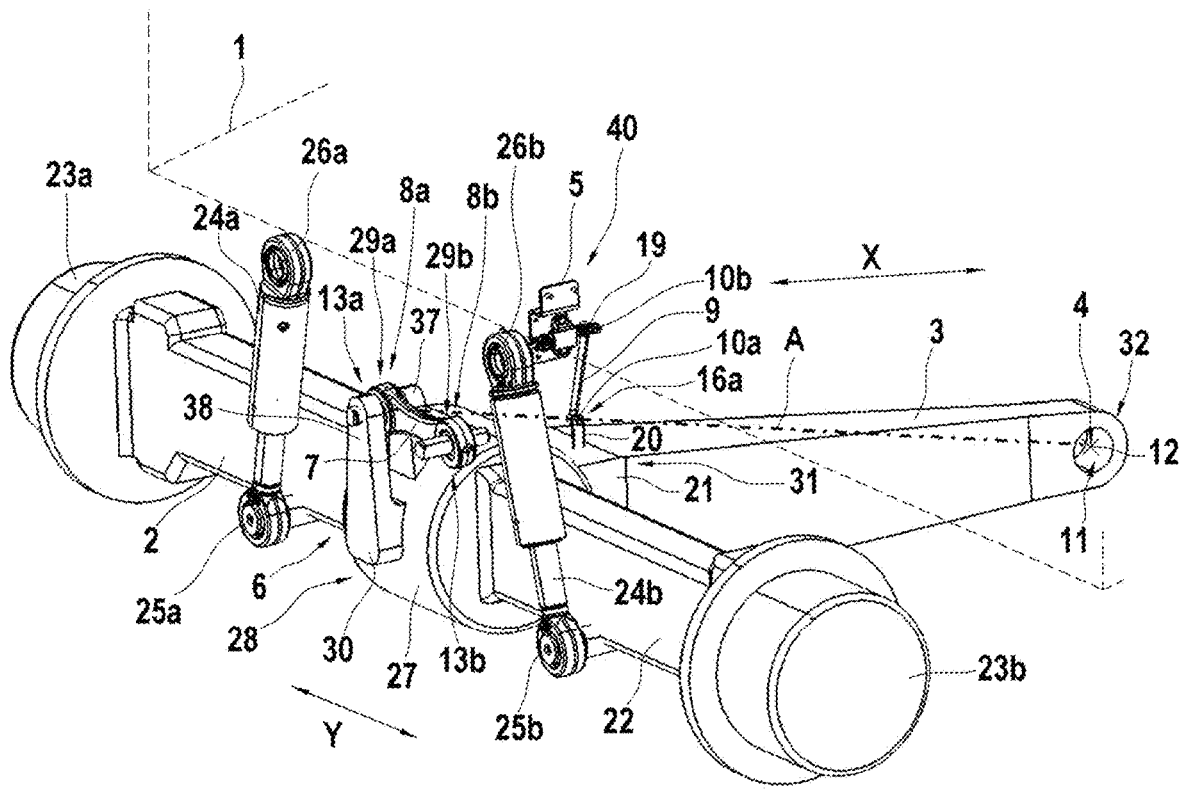
[Fig. 2]
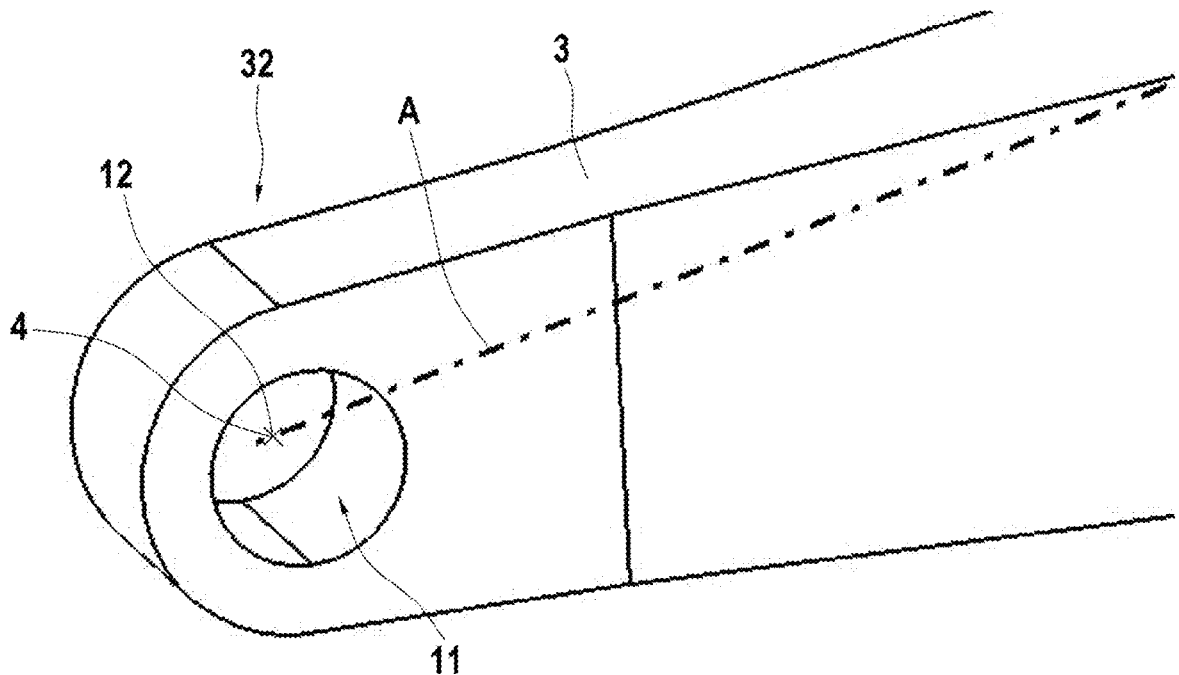

[Fig. 3]
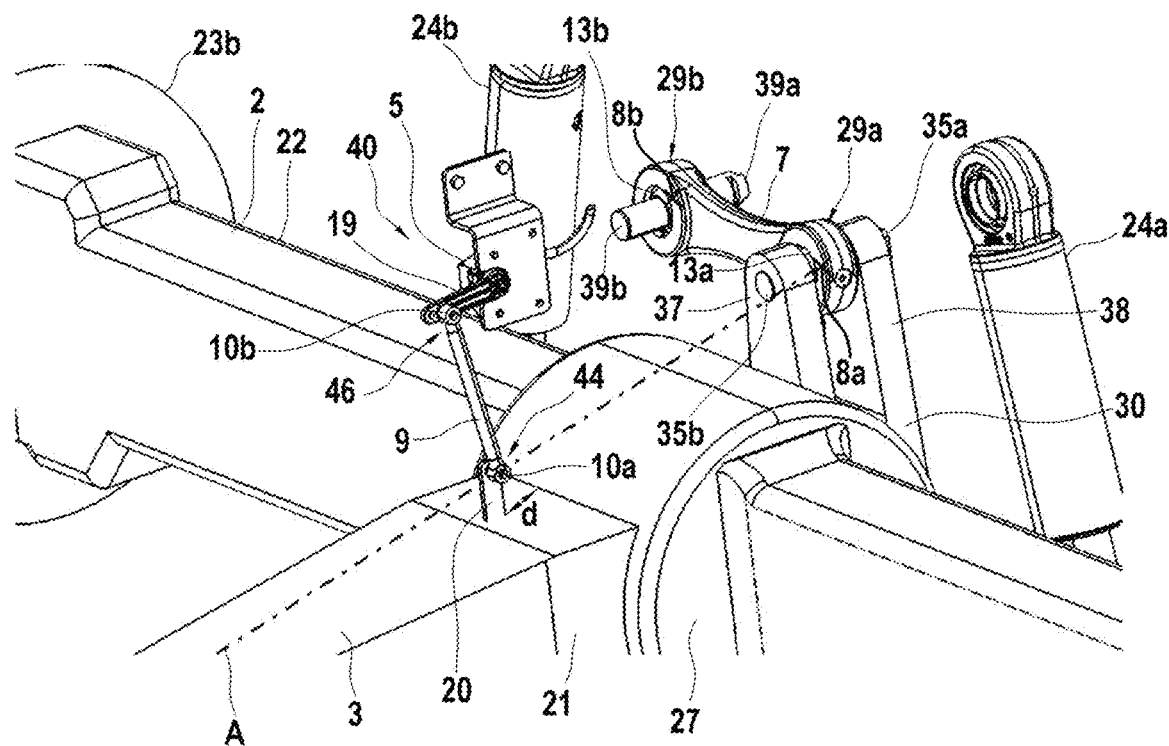
[Fig. 4]
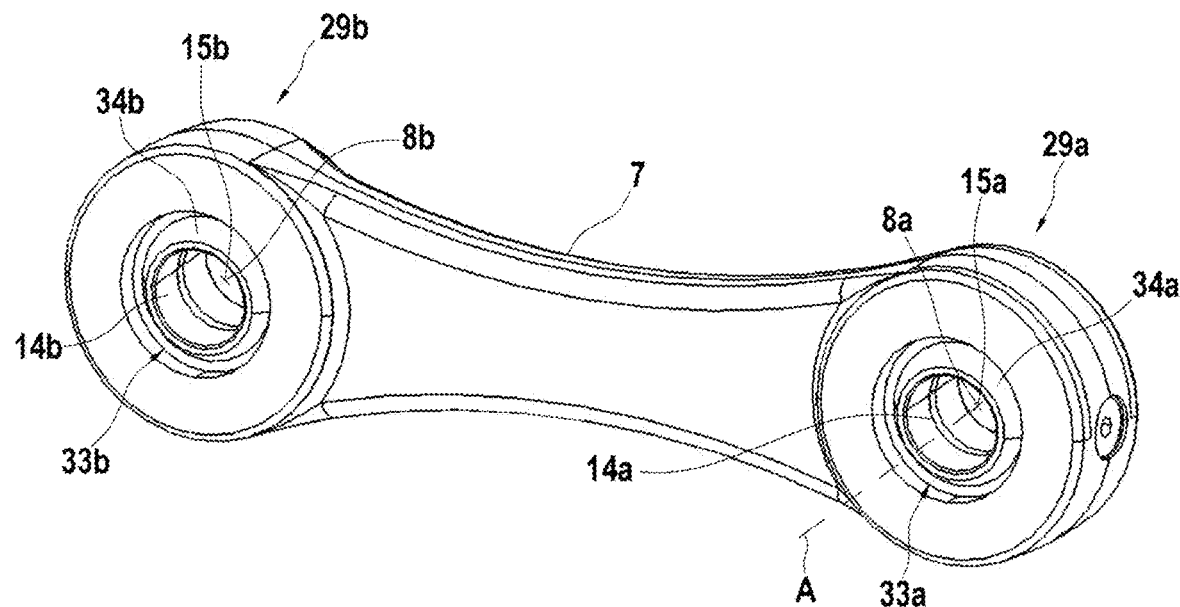

[Fig. 5]
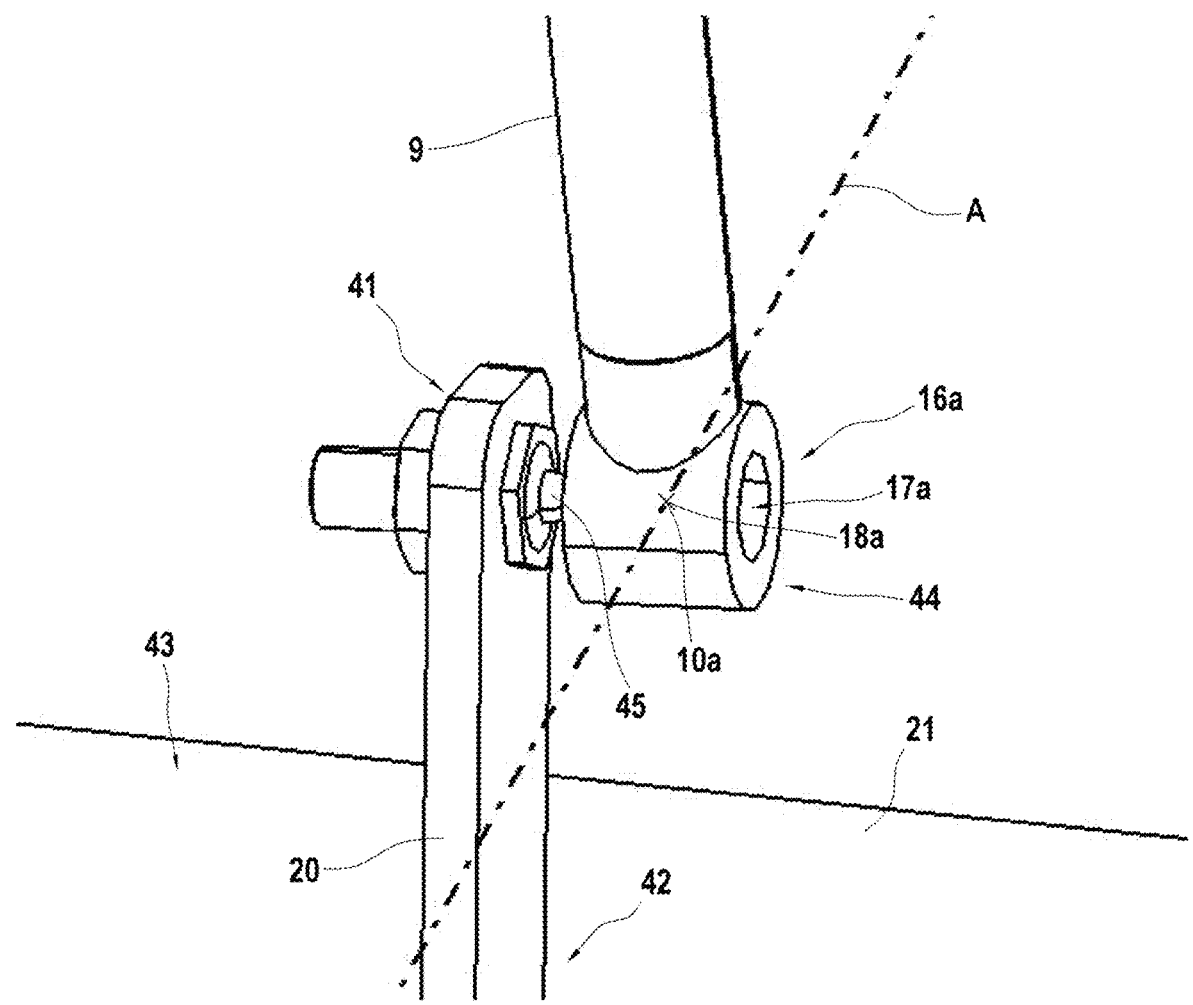

WORK VEHICLE COMPRISING A SENSOR FOR DETECTING MOVEMENT OF A HEIGHT-SETTABLE AXLE

CROSS REFERENCE TO RELATED APPLICATIONS

This application claims priority to European patent application No. EP24305242, filed on Feb. 13, 2024, disclosed herein by reference in its entirety.

TECHNICAL FIELD

The present disclosure relates generally to the field of work vehicles and particularly to a work vehicle comprising a height-settable vehicle axle and a sensor for measuring a distance between the vehicle axle and a vehicle support structure.

BACKGROUND

A work vehicle as a tractor typically comprises a vehicle axle connected to a vehicle support structure via a vehicle suspension system comprising a vehicle suspension link device. The vehicle axle comprises two front wheels or two rear wheels that are in contact with the ground.

The vehicle suspension link device comprises a link element with a first and a second ball joints for connection of the link element to the vehicle support structure and to the vehicle axle respectively.

The vehicle support structure is in particular a chassis or a body of the work vehicle, or else an undercarriage or a frame of the vehicle. In a vehicle suspension system, the link element, also referred to as "panhard link", acts to prevent or restrain movement of the axle in directions other than in a vertical or substantially vertical plane. In particular, the link element, which usually extends transversely to the vehicle front-back direction, prevents or contributes to prevent that the wheels attached to the axle move laterally, that is side-to-side.

In the present disclosure, the terms "frontward," "rearward," "transverse", "side," "upper," and "lower" may be understood relative to a direction in which the vehicle, on which the suspension link device is mounted, is travelling.

The position (the height) of the vehicle support structure relative to the axle may be vary and may be adjusted, automatically or manually.

To allow for such adjustment, the distance between the vehicle support structure and the front axle must be measured by a sensor.

The sensor measures movements of the axle in a vertical direction. The link element may be associated with the sensor for detecting and measuring the movement of the axle.

In some circumstances, in particular in case the vehicle is a work vehicle, such as a tractor or the like, intended to travel on uneven ground and potentially subject to heavy stresses, there is a risk for the link element to be subject to undesired movements which might adversely affect accuracy of the measurement made by the sensor.

Also, the suspension link system may be deliberately mounted so as to allow a small extent of "unwanted movements". For example, in a work vehicle, the vehicle axle may be connected to a first end of a longitudinal rocking arm. The longitudinal rocking arm extends rearward the axle and a second end of the longitudinal rocking arm is connected to the vehicle support structure via a ball joint comprising a pivot point. A rotation of the longitudinal rocking arm causes the axle to rotate around the pivot point, thus causing a 3D movement of the link element.

However, an undesired movement of the link element in a non-vertical direction due to the axle tilting can erroneously be taken into account by the sensor in the measurement of the axle movement that the sensor aims at measuring.

EP4140786B1 aims at solving this issue in providing a work vehicle comprising a suspension link device having a curved link element with a first and a second connection locus for connection of the link element to the vehicle support structure and to a vehicle axle respectively. The work vehicle comprises a sensor link attached to the link element at an attachment point located on a virtual straight axis joining the first connection locus and the second connection locus of the link element. The sensor link is connected to an angle sensor.

However, the curved link element has itself a tilting freedom due to the two ball joints at the first and a second connection locus that can affect the accuracy of the sensor measurements.

Straight link elements are more commonly used but their tilting movements also affect the accuracy of the measurement.

Moreover, the shape of the curved link element is not optimized compared to traction/compression efforts contrary. Straight link elements are preferred.

SUMMARY

The present disclosure aims at avoiding or at least substantially limiting the risks that an undesired movement of the link element be erroneously taken into account by the sensor in the detection of the axle movement enabling to determinate with accuracy the position of the vehicle axle relative to the vehicle support structure.

Accordingly, the present application provides a work vehicle comprising a vehicle support structure, a vehicle axle and a longitudinal rocking arm attached to the vehicle axle. The longitudinal rocking arm comprises a first connection locus connected to the vehicle support structure. The work vehicle comprises a sensor configured for detecting movement of the vehicle axle relative to the vehicle support structure and a vehicle suspension system comprising a vehicle suspension link device. The vehicle suspension link device comprises a link element comprising a second connection locus connected to the vehicle axle and a third connection locus connected to the vehicle support structure.

The work vehicle comprises a sensor link comprising a first attachment point connected to the vehicle axle and a second attachment point connected to the sensor. The first attachment point is located on a virtual straight axis connecting the first connection locus of the longitudinal rocking arm and the second connection locus of the link element.

Thus, the application provides a work vehicle comprising a sensor device enabling to detect the movement of the vehicle axle relative to the vehicle support structure with accuracy. The sensor can measure the distance between the vehicle axle and the vehicle support structure with accuracy. The measurement accuracy is not affected by the vehicle axle tilting movements neither by the link element tilting movements.

The application also enables to use conventional straight link elements having an optimized shape for traction/compression efforts. Cost reductions are also achieved.

Optionally, the first attachment point is located between the first connection locus and the second connection locus.

Optionally, the first connection locus of the longitudinal rocking arm is connected to the vehicle support structure via a first ball joint comprising a first spherical bearing, the first spherical bearing comprising a first center defining the first connection locus.

Optionally, the second connection locus of the link element is connected to the vehicle axle via a second ball joint comprising a second spherical bearing, the second spherical bearings comprising a second center defining the second connection locus.

Optionally, the sensor link is connected to the vehicle axle via a fourth ball joint comprising a fourth spherical bearing, the first attachment point of the sensor link being at a fourth center of the fourth spherical bearing.

Optionally, the virtual straight axis belongs to a central plan of the work vehicle crossing axially the middle of the vehicle axle and the middle of the longitudinal rocking arm.

Optionally, the sensor is attached to the vehicle support structure, the sensor link being a transmitting sensor link caused to move due to a movement of the vehicle axle and configured to transmit said movement to the sensor.

Optionally, it comprises a bracket secured to the vehicle axle, the first attachment point being connected to the bracket.

Optionally, the bracket is secured to a rear part of the vehicle axle connected to the longitudinal rocking arm.

Optionally, the vehicle axle comprises a main part perpendicular to the longitudinal rocking arm, the bracket being located near the main part, at a distance d inferior than 5 cm from the main part for instance.

Optionally, the first attachment point is located between the first connection locus and the main part of the vehicle axle.

BRIEF DESCRIPTION OF THE DRAWINGS

Other features, aims and advantages of the application will be detailed in the following description, which is purely illustrative and should not be interpreted in a limiting way, and which should be read in view of the enclosed drawings, wherein:

FIG. 1 is a schematic representation of a front part of a work vehicle according to an aspect of the present disclosure.

FIG. 2 is a detailed representation of a first connection locus of a longitudinal rocking arm of the work vehicle of the FIG. 1.

FIG. 3 illustrates a second connection locus of a link element and a first attachment point of a sensor link.

FIG. 4 is a detailed representation of the second connection locus of the link element.

FIG. 5 is a detailed representation of the first attachment point of the sensor link.

In the various drawings, elements in common are designated by identical numeral references.

DETAILED DESCRIPTION

FIG. 1 is a schematic representation of front part of a work vehicle according to an aspect of the present disclosure.

Although the work vehicle is described with reference to a specific example, it should be understood that modifications and changes may be made to this example without going beyond the general scope as defined by the claims. Consequently, the description and the drawings should be considered in a sense that is illustrative rather than restrictive. The figures, which are not necessarily to scale, depict illustrative aspects and are not intended to limit the scope of the disclosure. The illustrative aspects depicted are intended only as exemplary.

While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the claims.

Additionally, the language used herein has been principally selected for readability and instructional purposes, and may not have been selected to delineate or circumscribe inventive subject-matter. Accordingly, the disclosure of the present disclosure is intended to be illustrative, but not limiting, of the scope of the disclosure, which is set forth in the claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

FIG. 1 shows a work vehicle as a tractor comprising a vehicle support structure 1, a vehicle axle 2 and a longitudinal rocking arm 3 attached to the vehicle axle 2.

The vehicle axle 2 extends in a transverse direction Y and comprises a main part 22 and a rear part 21 extending from a central part 27 of the main part 22 according to an axial direction X, perpendicular to the transverse direction Y. The longitudinal rocking arm 3 has a first end 31 that is fixed to the rear part 21 of the vehicle axle 2. The longitudinal rocking arm 3 extends from the rear part 21 in the axial direction X.

The longitudinal rocking arm 3 comprises a second end 32, opposed to the first end 31 and provided with a first connection locus 4 connected to the vehicle support structure 1 via a first ball joint comprising a first spherical bearing. The first spherical bearing comprises a first center 12 defining the first connection locus 4 as shown in the FIG. 2.

Optionally, the first connection locus 4 can be defined by another part of the first ball joint that differs from the first center 12.

Here, "connection locus", which may also be referred to as "connection site", refers to the location, in the longitudinal rocking arm 3 enabling the second end 32 to be connected to the vehicle support structure 1.

The first connection locus 4 comprises a first hole 11 housing the first spherical bearing. The first center 12 of the first spherical bearing is also the center of the first hole 11. The first hole 11 has a circular section.

The first spherical bearing can comprises a first spherical ball portion (not shown) provided with first projecting rod portions projecting from the first spherical ball portion.

The lateral ends of the vehicle axle 2 are provided with mounts 23a and 23b for mounting wheels. In particular, the vehicle axle 2 may be a vehicle axle for steerable wheels located at a front side of the work vehicle or at a rear side of the work vehicle.

The work vehicle comprises a vehicle suspension system comprising suspension dampers 24a, 24b such as hydraulic cylinders, connected to the vehicle axle 2, at first respective ends 25a and 25b of the suspension dampers 24a, 24b via two respective ball joints, while second respective ends 26a and 26b of the suspension dampers 24a, 24b are intended to be connected to a vehicle support structure 1 (shown in phantom line), such as a chassis or a body of the work vehicle 2, or an undercarriage or a frame of the work vehicle 2, via two other respective ball joints.

The vehicle suspension system comprises a suspension link device 6 at a front face 28 of the central part 27 of the vehicle axle 2, which comprises a link element 7, generally oriented in the vehicle transverse direction Y. A first end 29a of the link element 7 is connected to the vehicle axle 2 via a supporting bracket 30. A second end 29b of the link element 7 is configured to be connected to the vehicle support structure 1. The link element 7 is also referred to as "panhard rod".

As shown in particular in FIGS. 1 and 3, the first end 29a has a second connection locus 8a for connection to the vehicle axle 2. Similarly, the second end 29b has a third connection locus 8b for connection to the vehicle support structure 1.

Here, "connection locus", which may also be referred to as "connection site", refers to the location, in the link element 7 enabling the link element 7 to be connected to the vehicle support structure 1 and the vehicle axle 2, respectively.

In the example, the link element 7 is configured to be connected to the vehicle axle 2 via a second ball joint 13a comprising a second spherical bearing 14a, as shown in FIG. 4. The second spherical bearings 14a comprises a second center 15a defining the second connection locus 8a.

Optionally, the second connection locus 8a can be defined by another part of the second ball joint 13a that differs from the second center 15a.

The second connection locus 8a or site comprises a second hole 33a at the first end 29a of the link element 7, said second hole 33a housing the second spherical bearing 14a. The second spherical bearing 14a comprises a second spherical ball portion 34a provided with second projecting rod portions 35a and 35b, projecting from the second spherical ball portion 34a frontward and rearward, respectively.

In particular, the second projecting rod portions 35a and 35b may be end portions of a rod arranged in a through hole of the second spherical ball portion 34a. The second projecting rod portions 35a and 35b are for connection with the supporting bracket 30 fixed to the central part 27 of the vehicle axle 2. The second spherical bearing 14a is located between two protrusions 37, 38 of the supporting bracket 30.

More precisely, these second projecting rod portions 35a and 35b are configured to be fixed to the supporting bracket 30 in releasable manner, for example in being engaged in holes at the upper portions of the protrusions 37, 38 of the supporting bracket 30 and secured therein by securing pins or the like.

On the example, as best seen in FIG. 3, the first end 29a of the link element 7 is sandwiched between the two protrusions 37, 38 of the supporting bracket 30 secured to the vehicle axle 2 at its lower portion. The second projecting rod portions 35a and 35b are engaged in holes at the upper portions of the protrusions 37, 38.

The second center 15a of the second spherical bearings 14a is also the center of the second ball joint 13a and the center of the second spherical ball portion 34a and the center of the second hole 33a.

The third connection locus 8b or site is similar to the second connection locus 8a.

The third connection locus 8b comprises a third hole 33b at the second end 29b of the link element 7, said second hole 33b housing the third spherical bearing 14b. The third spherical bearing 14b comprises a third spherical ball portion 34b provided with third projecting rod portions 39a and 39b, projecting from the third spherical ball portion 34b frontward and rearward, respectively. In particular, the third projecting rod portions 39a and 39b may be end portions of a rod arranged in a through hole of the third spherical ball portion 34b. The third projecting rod portions 39a and 39b are for connection with the vehicle support structure 1.

Similarly than for the second connection locus 8a, the third projecting rod portions 39a and 39b may be engaged in protrusions of a supporting bracket (not shown) secured to the vehicle support structure 1.

The third spherical bearing 14b has a third center 15b which is also the center of the third ball joint 13b.

The work vehicle of the embodiment comprises a sensor device 40 for detecting the displacement of the vehicle axle 2 relative to the vehicle support structure. The height or the distance of the vehicle support structure 1 relative to the vehicle axle 2 can be determined by a control device.

The sensor device 40 comprises a sensor link 9 for detecting the movement of the vehicle axle 2. The sensor link 9 is attached to the vehicle axle 2 at a first attachment point 10a.

The first attachment point 10a is located on a virtual straight axis A joining the first connection locus 4 of the longitudinal rocking arm 3 and the second connection locus 8a of the link element 7.

In the example, the virtual axis A passes through the respective geometric centers 12 and 15a of the first and second connection loci 4 and 8a.

The first center 12 of the first spherical bearing defines the first connection locus 4. The second center 15a of the second spherical bearings 14a defines the second connection locus 8a.

Said differently, the virtual axis A passes through the respective geometric centers 12 and 15a of the first spherical bearing and second spherical bearings 14a.

The virtual axis A passes also through the respective geometric centers 12 and 15a of the first hole 11 of the first connection locus 4 and the second hole 33a of the second connection locus 8a.

The first attachment point 10a is located between the first connection locus 4 and the second connection locus 8a.

In the example, the virtual straight axis A and the first attachment point 10a belong to a central plan of the work vehicle crossing the middle of the vehicle axle 2 and the middle of the longitudinal rocking arm 3. The central plan is parallel to the axial direction X.

As best seen in FIGS. 3 and 5, a bracket 20 is secured to the vehicle axle 2. The first attachment point 10a is connected to the bracket 20.

The bracket 20 is secured to the rear part 21 of the vehicle axle 2 that is connected to the longitudinal rocking arm 3. As said previously, the rear part 21 extends from the central part 27 of the main part 22.

In the example, the bracket 20 is located in a central position of the rear part 21 of the vehicle axle 2 according to the transverse direction Y.

The bracket 20 is preferably positioned in the vicinity of the central part 27 of the main part 22 of the vehicle axle 2. For instance, the bracket 20 is located at a distance d inferior than 5 cm from the central part 27 of the main part 22 of the vehicle axle 2 and preferably inferior to 2 cm. The bracket 20 is preferably positioned as close as possible to the central part 27 of the main part 22 of the vehicle axle 2 in order to improve the measurement accuracy of the sensor 5.

Alternatively, the bracket 20 can be directly attached to the central part 27 of the main part 22 of the vehicle axle 2.

Alternatively, the bracket 20 is attached to the central part 27 next to the second connection locus 8a. The bracket 20 is attached to the central part 27 at a distance less than 5 cm from the second connection locus 8a and preferably less than 3 cm, for instance.

The sensor link 9 is secured to a first end 41 of the bracket 20. The bracket 20 extends from an upper face 43 of the rear part 21 of the vehicle axle 2 and perpendicularly with respect to the upper face 43. The bracket 20 extends sensibly perpendicularly to the axial direction X and perpendicularly to the transverse direction Y.

The bracket 20 has a second end 42 that may be secured to the vehicle axle 2 by any suitable means, such as, for example, bolts or riveting or welding.

The sensor link 9 may be secured to the bracket 20 by any suitable means, in particular means allowing a releasable fixation, such as bolts or the like.

In the example, the sensor link 9 is connected to the bracket 20 via a fourth ball joint 16a comprising a fourth spherical bearing. The first attachment point 10a of the sensor link 9 is at a fourth center 18a of the fourth spherical bearing.

Optionally, the first attachment point 10a is defined by another part of the fourth spherical bearing that differs from the fourth center 18a.

The sensor link 9 comprises a first end 44 having a fourth hole 17a housing the fourth spherical bearing. The fourth center 18a of the fourth spherical bearing is also the center of the fourth hole 17a.

The fourth spherical bearing comprises a fourth spherical ball portion provided with a fourth projecting rod portion 45, projecting from the fourth spherical ball portion. The fourth projecting rod portion 45 is engaged in a hole provided at the first end 41 of the bracket 20.

The first end 44 of the sensor link 9 has a 3 degrees of freedom relative to the bracket 20.

The sensor 5 is attached to the vehicle support structure 1. The sensor link 9 is a transmitting sensor link caused to move due to a movement of the vehicle axle 2 and configured to transmit said movement to the sensor 5.

In the example, the sensor link 9 is a sensor rod having a second end 46 connected to the sensor 5 by a link rod 19 in articulated manners.

The sensor link 9 formed by the sensor rod generally extends in a generally vertical plane and a vertical movement of the vehicle axle 2 with respect to the vehicle support structure 1 causes the link rod 19 to rotate. In the example, the sensor 5 is an angular sensor that measures the angle covered by such rotation and, hence, the magnitude of the vertical movement of the vehicle axle 2.

The sensor link 9 can be connected to the link rod 19 via a ball joint, for instance.

The distance between the vehicle axle 2 and the vehicle support structure 1 is settable, automatically or manually. The control device enables to set automatically the distance between the vehicle axle 2 and the vehicle support structure 1. The control device receives the measurements of the sensor 5 and manages the suspension dampers 24a, 24b stroke via an automatic regulation loop, for instance.

A manual mode is also possible. The driver can pilot the suspension dampers 24a, 24b stroke depending of the current position of the vehicle axle 2 relative to the vehicle support structure 1 showed on a vehicle dashboard.

The sensor 5 measures an angle variation of the link rod 19 that is converted in a distance variation between the vehicle axle 2 and the vehicle support structure 1 by the control device.

The sensor link 9 and the link rod 19 remain at the same position whatever the tilting of the vehicle axle 2 with respect to the vehicle support structure 1.

The tilting movement of the vehicle axle 2 and the tilting movement of the link element 7 do not affect the angle measurement and thus the measurement of the position of the vehicle axle 2 relative to the vehicle support structure 1.

The first attachment point 10a of the fourth center 18a of the fourth spherical bearing of the sensor element 9 is located on the virtual axis A. The first center 12 of the first spherical bearing of the longitudinal rocking arm 3, the second center 15a of the second spherical bearings 14a of the link element 7 are located on the virtual straight axis A.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of the system may be transposed, alone or in combination, to a method and/or an apparatus and vice versa.

The invention claimed is:

1. A work vehicle comprising a vehicle support structure, a vehicle axle, a longitudinal rocking arm attached to the vehicle axle and comprising a first connection locus connected to the vehicle support structure, a sensor configured for detecting movement of the vehicle axle relative to the vehicle support structure and a vehicle suspension system comprising a vehicle suspension link device comprising a link element comprising a second connection locus connected to the vehicle axle and a third connection locus connected to the vehicle support structure, the work vehicle comprising a sensor link comprising a first attachment point connected to the vehicle axle and a second attachment point connected to the sensor, the first attachment point being located on a virtual straight axis connecting the first connection locus of the longitudinal rocking arm and the second connection locus of the link element.

2. The work vehicle according to claim 1, wherein the first attachment point is located between the first connection locus and the second connection locus.

3. The work vehicle according to claim 1, wherein the first connection locus of the longitudinal rocking arm is connected to the vehicle support structure via a first ball joint comprising a first spherical bearing, the first spherical bearing comprising a first center defining the first connection locus.

4. The work vehicle according to claim 1, wherein the second connection locus of the link element is connected to the vehicle axle via a second ball joint comprising a second spherical bearing, the second spherical bearings comprising a second center defining the second connection locus.

5. The work vehicle according to claim 1, wherein the sensor link is connected to the vehicle axle via a fourth ball joint comprising a fourth spherical bearing, the first attachment point of the sensor link being at a fourth center of the fourth spherical bearing.

6. The work vehicle according to claim 1, wherein the virtual straight axis belongs to a central plan of the work vehicle crossing axially the middle of the vehicle axle and the middle of the longitudinal rocking arm.

7. The work vehicle according to claim 1, wherein the sensor is attached to the vehicle support structure, the sensor link being a transmitting sensor link caused to move due to a movement of the vehicle axle and configured to transmit said movement to the sensor.

8. The work vehicle according to claim 1, further comprising a bracket secured to the vehicle axle, the first attachment point being connected to the bracket.

9. The work vehicle according to claim 8, wherein the bracket is secured to a rear part of the vehicle axle connected to the longitudinal rocking arm.

10. The work vehicle according to claim 9, wherein the vehicle axle comprises a main part perpendicular to the longitudinal rocking arm, the bracket being located at a distance d inferior than 5 cm from the main part.

11. A work vehicle comprising a vehicle support structure, a vehicle axle, a longitudinal rocking arm attached to the vehicle axle and comprising a first connection locus connected to the vehicle support structure, a sensor configured to detect movement of the vehicle axle relative to the vehicle support structure and a vehicle suspension system comprising a vehicle suspension link device comprising a link element comprising a second connection locus connected to the vehicle axle and a third connection locus connected to the vehicle support structure, the work vehicle comprising a sensor link comprising a first attachment point connected to the vehicle axle and a second attachment point connected to the sensor, wherein the first attachment point is located on a virtual straight axis connecting the first connection locus of the longitudinal rocking arm and the second connection locus of the link element.

12. The work vehicle according to claim 11, wherein the first attachment point is located between the first connection locus and the second connection locus.

13. The work vehicle according to claim 11, wherein the first connection locus of the longitudinal rocking arm is connected to the vehicle support structure via a first ball joint comprising a first spherical bearing, the first spherical bearing comprising a first center defining the first connection locus.

14. The work vehicle according to claim 11, wherein the second connection locus of the link element is connected to the vehicle axle via a second ball joint comprising a second spherical bearing, the second spherical bearings comprising a second center defining the second connection locus.

15. The work vehicle according to claim 11, wherein the sensor link is connected to the vehicle axle via a fourth ball joint comprising a fourth spherical bearing, the first attachment point of the sensor link being at a fourth center of the fourth spherical bearing.

16. The work vehicle according to claim 11, wherein the virtual straight axis belongs to a central plan of the work vehicle crossing axially the middle of the vehicle axle and the middle of the longitudinal rocking arm.

17. The work vehicle according to claim 11, wherein the sensor is attached to the vehicle support structure, the sensor link being a transmitting sensor link caused to move due to a movement of the vehicle axle and configured to transmit said movement to the sensor.

18. The work vehicle according to claim 11, further comprising a bracket secured to the vehicle axle, the first attachment point being connected to the bracket.

19. The work vehicle according to claim 18, wherein the bracket is secured to a rear part of the vehicle axle connected to the longitudinal rocking arm; wherein the vehicle axle comprises a main part perpendicular to the longitudinal rocking arm, the bracket being located at a distance d inferior than 5 cm from the main part.

\* \* \* \* \*